United States Patent [19]

Yamamuro et al.

[11] Patent Number: 4,865,949

[45] Date of Patent: Sep. 12, 1989

[54] OPTICAL INFORMATION RECORDING MEDIUM

[75] Inventors: Tetsu Yamamuro, Tokyo; Yutaka Ueda, Yokohama, both of Japan

[73] Assignee: Ricoh Company, Ltd., Tokyo, Japan

[21] Appl. No.: 183,896

[22] Filed: Apr. 20, 1988

Related U.S. Application Data

[63] Continuation-in-part of Ser. No. 5,948, Jan. 22, 1987, abandoned.

[30] Foreign Application Priority Data

Jan. 22, 1986 [JP] Japan .................. 61-10247
Feb. 11, 1986 [JP] Japan .................. 61-162063

[51] Int. Cl.$^4$ ............... G01D 15/34; G01D 15/32
[52] U.S. Cl. .................................. 430/272; 430/945; 522/13; 522/24; 522/29; 522/170; 428/64; 428/65; 346/137; 346/135.1; 369/286; 369/284
[58] Field of Search ............ 430/272, 945; 522/13, 522/24, 29, 170; 428/64, 65; 346/137, 135.1; 369/286, 284

[56] References Cited

U.S. PATENT DOCUMENTS

| | | | |
|---|---|---|---|
| 4,406,764 | 9/1983 | Hayase et al. | 522/29 |
| 4,479,860 | 10/1984 | Hayase et al. | 522/13 |
| 4,583,102 | 4/1987 | Tamamura et al. | 430/945 X |
| 4,593,051 | 6/1986 | Koleske | 522/170 X |
| 4,616,238 | 10/1986 | Tani et al. | 369/284 X |
| 4,666,951 | 5/1987 | Onishi et al. | 522/170 X |
| 4,731,620 | 3/1988 | Yabe et al. | 428/65 X |

FOREIGN PATENT DOCUMENTS

| | | | |
|---|---|---|---|
| 0068322 | 4/1984 | Japan | 522/170 |
| 0229976 | 11/1985 | Japan | 522/170 |
| 0263354 | 12/1985 | Japan | 369/284 |
| 1009419 | 1/1986 | Japan | 522/13 |
| 259245A | 11/1987 | Japan | |
| 8201556 | 11/1982 | Netherlands | 369/284 |

Primary Examiner—Paul R. Michl
Assistant Examiner—Cynthia Hamilton
Attorney, Agent, or Firm—Oblon, Spivak, McClelland, Maier & Neustadt

[57] ABSTRACT

An optical information recording medium is disclosed, which comprises a pair of disc-shaped substrates, at least one of the substrates having a recording layer comprising an organic dye compound on one side thereof, which are disposed so as to face each other, with the recording layer positioned therebetween, with or without a space between the two substrates, by sealing with an adhesive agent comprising an alicyclic epoxy resin component having general formula

[structural formula]

where $R^1 \sim R^9$ each represent hydrogen, an alkyl group having 1 to 4 carbon atoms, or halogen; and R represents $(CH_2)_n$, where n is an integer of 1 to 4,

[structural formulas]

and a composite catalyst comprising a photo-decomposition organic silicon compound and a metal complex.

8 Claims, 1 Drawing Sheet

U.S. Patent  Sep. 12, 1989  4,865,949
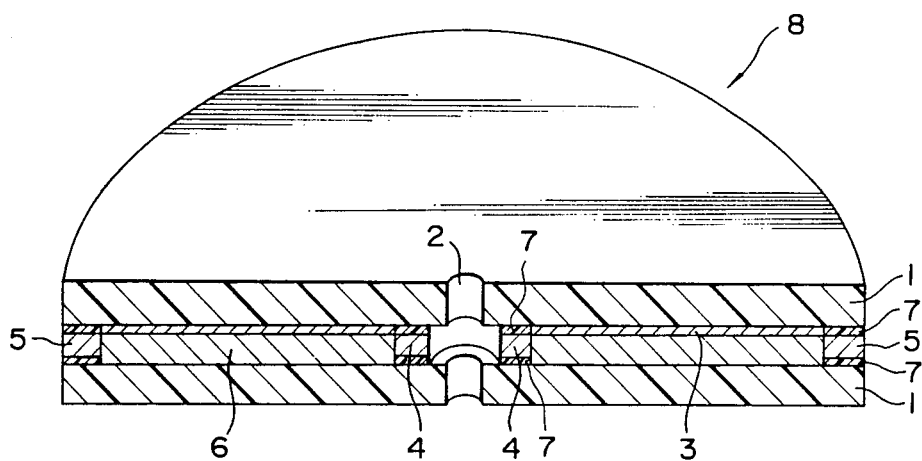

OPTICAL INFORMATION RECORDING MEDIUM

This application is a continuation-in-part of Copending patent application Ser. No. 07/005,948 filed Jan. 22, 1987, now abandoned.

BACKGROUND OF THE INVENTION

The present invention relates to an optical information recording medium of a sealed type comprising a pair of disc-shaped substrates and a recording layer formed thereon for recording therein optical information and reproducing the same therefrom.

Conventionally, when fabricating an optical information recording medium including a recording layer comprising an organic dye compound by sealing a pair of disc-shaped substrates and a spacer interposed therebetween, an epoxy adhesive agent is employed. A conventional epoxy adhesive agent is advantageous over other adhesive agents in that it decreases neither the reflection ratio nor the S/N ratio of the recording material of the recording medium. However, since the epoxy adhesive agent is a thermosetting adhesive agent, there is the risk that the substrate is deformed during the application of heat for hardening the epoxy adhesive agent. Further, the epoxy adhesive agent has the shortcoming that the productivity of the recording medium is not good because an extended period of time is required for the hardening of the adhesive agent, and a jig is necessary for fixing the substrates, spacer and other members during the hardening.

In order to avoid the above shortcomings, a novel adhesive agent comprising an ultraviolet-ray-hardening resin containing a radical polymerization initiator is recently used. This novel adhesive agent does not have the shortcomings of the above-mentioned epoxy adhesive agent, but it does have the shortcoming that the reflection ratio of the recording member of the disc-shaped recording medium, or the S/N ratio thereof is decreased by an unhardened portion of the adhesive agent which is pressed out from the sealed portions.

Further, adhesive agents comprising an epoxy resin containing a cationic photo-polymerization initiator comprising an onium salt, such as triaryl sulfonium salt, dialkylphenaoyl sulfonium salt, dialkyl-4-hydroxyphenyl sulfonium salt, and diaryl iodonium salt, with a counter ion such as $SbF_6^\ominus$, $BF_4^\ominus$, $PF_6^\ominus$, and $AsF_6^\ominus$, have been proposed for the above sealing. These adhesive agents do not have the problem that the pressed out portion of the adhesive agent is not hardened, but has the shortcoming that a strong acid containing any of the above counter ions is produced during the hardening process of the adhesive agent and the organic dye compound contained in the recording layer of the recording medium is damaged by the strong acid.

In order to solve the above problem of the adhesive agent, the inventors of the present invention proposed an adhesive agent comprising (i) an epoxy resin component and (ii) a composite catalyst comprising a photo-decomposing organic silicone compound and a metal complex in Japanese Laid-Open patent application No. 62-259245. This adhesive agent is hardened by photo-cationic polymerization and the hardening thereof is particularly quick when alicyclic epoxy resins are employed. This adhesive agent, however, has the shortcoming that some of the epoxy resins have an adverse effect on the organic dye compound contained in the recording medium, and this shortcoming cannot be completely eliminated. In particular, the following epoxy resins are not suitable for use with the organic dye compounds. ERU 2021, 3000, 3000, EHPE 3150-1 (made by Daicel Chemical Industries, Ltd.); ERL 4206 and ERU 4234 (made by Union Carbide Corp.), and

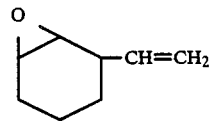

It is reported that ERU 4234 is a skin-cancer-causing material.

SUMMARY OF THE INVENTION

It is therefore an object of the present invention to provide an optical information recording medium of a sealed type comprising a pair of disc-shaped substrates, and a recording layer comprising a recording material, formed on at least one of the substrates, which are disposed so as to face each other, with the recording layer positioned therebetween. This recording medium can be fabricated by sealing the substrates with an adhesive agent, without using a fixing jig for an extended period of time when the sealed portion is hardened with application of heat thereto or at room temperature, thereby improving the productivity of the recording medium and preventing the deformation of the substrates during the sealing.

Another object of the present invention is to provide an optical information recording medium of a sealed type fabricated by an adhesive agent, comprising a pair of disc-shaped substrates, and a recording layer comprising as a recording material an organic dye compound formed on at least one of the substrates, which adhesive agent does not have adverse effects on the recording material.

The above objects of the present invention can be achieved by an optical information recording medium comprising a pair of disc-shaped substrates, at least one of the substrates having a recording layer comprising an organic dye compound on one side thereof, which are disposed so as to face each other, with the recording layer positioned therebetween, with or without a space between the two substrates, by sealing with an adhesive agent comprising an alicyclic epoxy resin component having general formula (I)

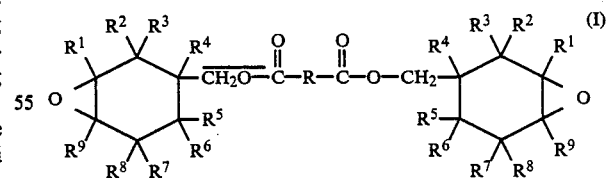

where $R^1 \sim R^9$ each represent hydrogen, an alkyl group having 1 to 4 carbon atoms, or halogen; and R represents $(CH_2)_n$, where n is an integer 1 to 4,

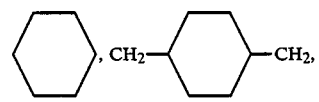

-continued

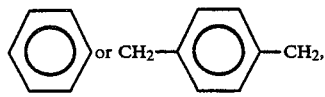

and a composite catalyst comprising a photo-decomposition organic silicon compound and a metal complex.

BRIEF DESCRIPTION OF THE DRAWING

The single FIGURE shows a cross-sectional view of an example of an optical information recording medium of a sealed type according to the present invention.

DETAILED DESCRIPTION OF THE PREFERRED EMBODIMENTS

According to the present invention, there is provided an optical information recording medium comprising a pair of disc-shaped substrates, at least one of the substrates having a recording layer comprising an organic dye compound on one side thereof, which are disposed so as to face each other, with the recording layer positioned therebetween, with or without a space between the two substrates, by sealing with an adhesive agent comprising an alicyclic epoxy resin component having general formula (I),

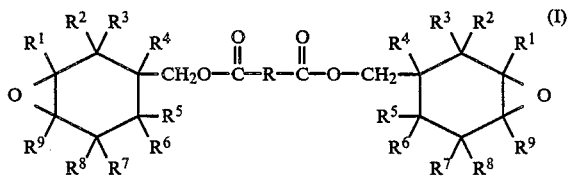

where $R^1 \sim R^9$ each represent hydrogen, an alkyl group having 1 to 4 carbon atoms, or halogen; and R represents $(CH_2)_n$, where n is an integer of 1 to 4,

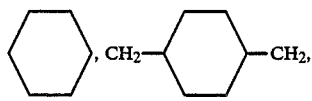

and a composite catalyst comprising a photo-decomposition organic silicon compound and a metal complex.

As the organic dye compound for use in the present invention, conventionally employed polymethine dyes can be employed.

As the organic dye compound, polymethine dyes such as cyanine dyes, merocyanine dyes, croconium dyes and pyrylium dyes, and other conventional direct dyes, acidic dyes, basic dyes, including phthalocyanine dyes, tetrahydrocholine dyes, dioxazine dyes, triphenethiazine dyes, phenelene dyes, anthraquinone (indanthrene) dyes, xanthene dyes, triphenylmethane dyes, azulene dyes, squalium dyes and naphthoquinone dyes can be employed.

Of the conventionally employed organic dyes, polymethine dyes, in particular the following cyamine dyes and merocyamine dyes are preferable for use in the present invention:

(a) Cyanine Dyes

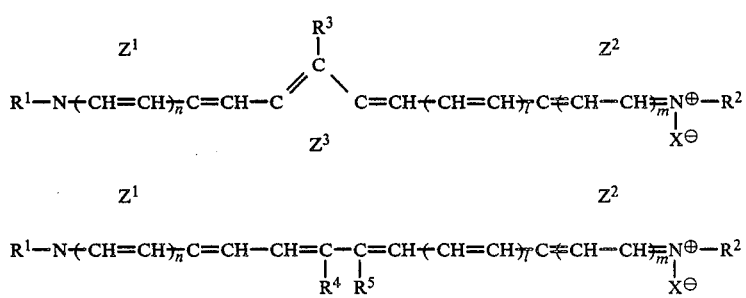

In the above formulas, $R^1$ and $R^2$ each represent a substituted or unsubstituted alkyl group or a substituted or unsubstituted aralkyl group or alkenyl group; $Z^1$ and $Z^2$ each represent a group of atoms required for completing a substituted or unsubstituted heterocyclic ring, $z^3$ represents a group of atoms required for completing a substituted or unsubstituted pentacyclic ring or hexacyclic ring, and the pentacyclic ring or hexacyclic ring may be condensed with an aromatic ring, $R^3$ represents a hydrogen atom or a halogen atom; $R^4$ and $R^5$ each represent a hydrogen atom, a halogen atom, a hydroxyl group, a carboxyl group, an alkyl group, or a substituted or unsubstituted aryl group or acryloxy; $X^\oplus$ represents an acid anion; and l, m and n each represent 0 or 1.

(b) Merocyanine Dyes

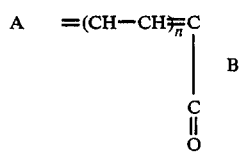

Wherein A represents, for example, any of the following rings, the benzene ring and naphthyl ring of which may have a substituent

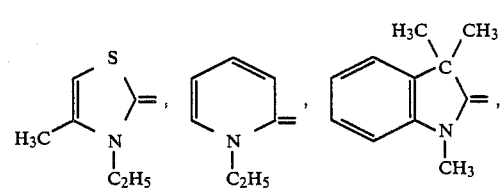

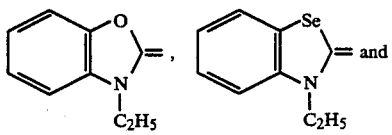

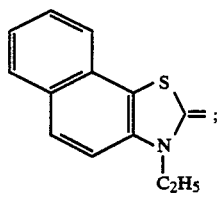

represents, for example, any of the following rings

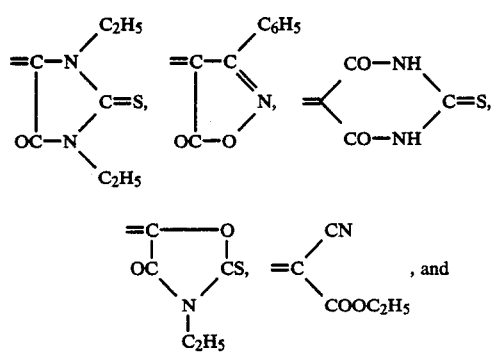

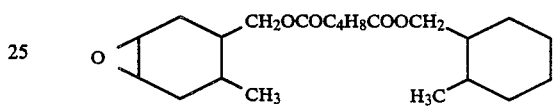

n is an integer of 1 or 2.

The above cyanine dyes and merocyanine dyes can be used individually or in combination in the recording layer.

When necessary conventionally employed stabilizers, for example, transition metal chelate complexes for improving the stability and light resistance of the above polymethine dyes, increasing the laser beam absorption and decreasing the reproduction deterioration, can be employed in combination with the above polymethine dyes.

Specific preferable examples of the alicyclic epoxy resin component of the general formula (I) for use in the present invention are as follows:

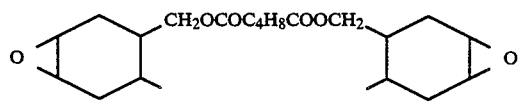

800~1100 m PaS (25° C.)
b.p. 258° C./1.33 kPa
(Trademark "ERL 4299" made by Union Carbide Corp.)

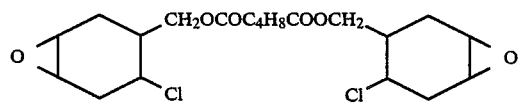

550~750 m PaS (25° C.)
b.p. 258° C./1.33 kPa
(Trademark "ERL 4289" made by Union Carbide Corp.)

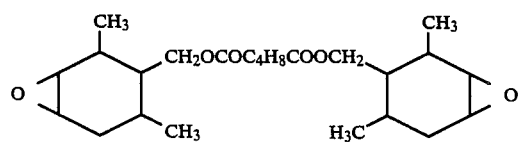

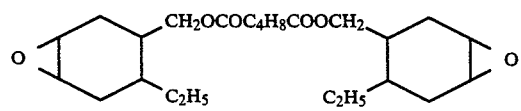

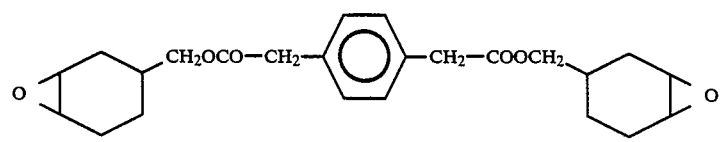

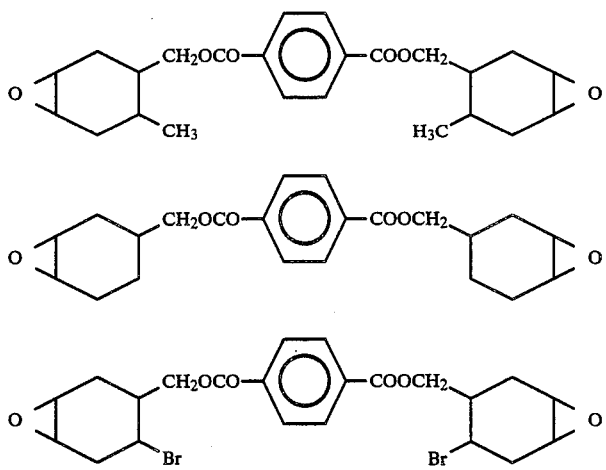

The above epoxy resin components are particularly preferable for use in the present invention. This is probably because the vapor pressures thereof are extremely low, so that the recording layer is not affected by the vapor of the epoxy resin components during the sealing process.

When any of the above alicyclic epoxy components is employed, one or more solid epoxy resins may be mixed with the alicyclic epoxy component to prepare a mixture of the alicyclic epoxy component and the solid epoxy resin with an appropriate viscosity.

Examples of such a solid epoxy resin are as follows:

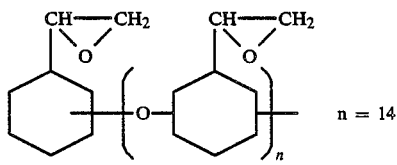

(Trademark "EHPE 3150" made by Daicel Chemical Industries, Ltd.)

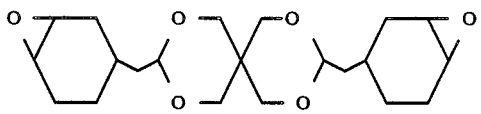

(Trademark "Spiroepoxy" made by Daicel Chemical Industries, Ltd.)

Furthermore, so long as the alicyclic epoxy resin component of general formula (I) is used as the main component in an amount of 75 wt.% or more, any of other epoxy resins such as epi-bis type epoxy resins, novolack type epoxy resins, other alicyclic epoxy resins, long-chain aliphatic epoxy resins, brominated epoxy resins, glycidyl ester epoxy resins, and heterocyclic type epoxy resins can also be employed in combination with the alicyclic epoxy resin component of general formula (I).

The metal complex type composite catalysts consisting of a photo-decomposition organic silicon compound and a metal complex for use in the present invention are used as photo-polymerization initiator for the epoxy resin components. The photo-decomposition organic silicon compound is stable in the dark. However, it is easily decomposed when exposed to ultraviolet ray to form silanol. The thus formed silanol, in collaboration with the metal complex, initiates the polymerization of the epoxy compound.

Examples of the photo-decomposition organic silicon compound are silyl peroxide, o-nitrobenzyl silyl ether, alkoxy silane and silyl ketone.

Specific examples of silyl peroxide are as follows:
($I_1$) tri(2-naphthyl)silyl-t-butyl peroxide,
($I_2$) diphenyl(1-naphthyl)silyl-t-butyl peroxide,
($I_3$) tris(4-chlorophenyl)silyl-t-butyl peroxide,
($I_4$) diphenyl-2-methylphenylsilyl-t-butyl peroxide,
($I_5$) di(1-naphthyl)silyldi(t-butyl)peroxide,
($I_6$) triphenylsilyl-t-butyl peroxide,
($I_7$) diphenylsilyldi(t-butyl)peroxide, Specific examples of o-nitrobenzyl silyl ether are as follows:
($I_8$) (o-nitrobenzyloxy)triphenyl silane,
($I_9$) bis(o-nitrobenzyloxy)diphenyl silane,
($I_{10}$) tris(4-chlorophenyl)-(o-nitrobenzyloxy)silane.

Specific examples of alkoxy silane are as follows:
($I_{11}$) diphenyldimethoxy silane,
($I_{12}$) diphenyldiethoxy silane,
($I_{13}$) diphenyldiisopropoxy silane,
($I_{14}$) diphenyldiacetoxy silane,
($I_{15}$) diphenyldiphenoxy silane,
($I_{16}$) triphenylmethoxy silane,
($I_{17}$) triphenylethoxy silane,
($I_{18}$) diphenylvinylethoxy silane,
($I_{19}$) triphenylhydroxy silane, A specific example of silylketone is
($I_{20}$) triphenylsilyl phenyl ketone.

Specific example of the metal complex are as follows:
Tris($\beta$-diketonato)aluminums, for example,
($C_1$) tris(acetylacetonato)aluminum,
($C_2$) tris(ethylaceto-acetato)aluminum,
($C_3$) tris(2,2,6,6-tetramethyl-3,5-heptanedionato)aluminum,
Tris($\beta$-ketoesterato)aluminums, for example,
($C_4$) tris(ethylacetoacetato)aluminum,
($C_5$) tris(tert-butylacetoacetato)aluminum,
($C_6$) tris(iso-butylacetoacetato)aluminum,
($C_7$) tris(n-propylacetoacetato)aluminum,
Tris(o-carbonylphenolato)aluminum, for example,
($C_8$) tris(salicylaldehydate)aluminum,
($C_9$) tris(ethylsalicylato)aluminum,
($C_{10}$) tris(phenylsalicylato)aluminum, (C₁₁) tris(o-acetylphenolato)aluminum.

Of the above metal complexes, the metal complexes (C₃) through (C₁₁) are high in the hardening rate and therefore preferable for use in the adhesive agent in the present invention.

With respect to the ratio of the epoxy resin component, the photo-decomposition organic silicon compound and the metal complex contained in the adhesive agent for use in the present invention, it is preferable that the photodecomposition organic silicon compound be in the range of 0.1 to 20 parts by weight, more preferably in the range of 0.5 to 10 parts by weight, and the metal complex be in the range of 0.05 to 10 parts by weight, more preferably in the range of 0.1 to 5 parts by weight, to 100 parts by weight of the epoxy resin component.

By adding a photosensitizer such as benzophenone, amine, benzoin ether to the photo-decomposition organic silicon compound and the metal complex, the photo-decomposition of the organic silicon compound can be increased.

Further, by adding a sensitizer such as Erythrosine B and a polymeric material such as polyvinyl pyrrolidone (PVP) to the peroxide type photo-decomposition organic silicon compounds and the metal complexes, the photo-decomposition rate of the photo-decomposition organic silicon compounds can be increased. Moreover by adding zeolite, porous silica, titanium oxide, phthalonitrile, p-dicyanobenzene, and vitamine E, the activity of the metal complexes can be increased.

With reference to the accompanying drawing, an optical information recording medium of a sealed type according to the present invention will now be explained.

Each of a pair of disc-shaped substrates 1 is made of, for example, a transparent plastic plate. In each substrate 1, a fitting hole 2 is formed at the center thereof. At least one of the substrates 1 includes a recording layer 3 at one surface thereof. The substrates 1 are disposed with an inner circumferential spacer 4 and an outer circumferential spacer 5 interposed therebetween in a configuration, in such a fashion that the recording layer 3 comes inside and a space 6 is formed between the substrates 1 as shown in the FIGURE.

An adhesive agent 7 is applied for fixing the pair of the substrates 1 through the spacers 1 and 5, whereby an optical information recording medium 8 is constructed. When the adhesive agent is hardened by the exposure to light, it is preferable that the adhesive agent be maintained at a pre-determined temperature.

The present invention is not necessarily restricted to the configuration as shown in the FIGURE. For instance, the recording layer 3 can be formed on both substrates 1 at one side each thereof.

The present invention will now be explained in more detail with reference to the following examples. These examples are given for illustration and are not intended to be limiting thereof.

EXAMPLE 1

The following components were mixed and dispersed to prepare a first dispersion.

| | Parts by Weight |
|---|---|
| Dipentaerythritol hexaaorylate | 30 |
| 2,2-bis(4-acryloxydiethoxyphenyl) propane | 10 |

-continued

| | Parts by Weight |
|---|---|
| Tetrahydrofurfuryl acrylate | 10 |
| Benzoin isobutyl ether | 2 |
| Isopropyl alcohol | 50 |
| Toluene | 10 |

The thus prepared first dispersion was coated by a dip coating on one side of each of a pair of disc-shaped polymethyl methacrylate substrates having a diameter of 200 mm and a thickness of 1.2 mm. The coated dispersion was dried for 15 minutes and then exposed to the ultraviolet-ray by a high pressure mercury lamp of 2 kW at a position 20 cm away from the substrates for 15 seconds.

Apart from the above, the following components were mixed and dispersed to prepare a second dispersion.

| | Parts by Weight |
|---|---|
| 2,2-bis-(4-acryloxydiethoxyphenyl) propane | 100 |
| Benzoin isobutyl ether | 3 |

This second dispersion was applied dropwise on a stamper made of nickel and each of the above prepared disc-shaped substrates was superimposed on the second dispersion applied nickel stamper and was then exposed to ultraviolet-ray by a high pressure mercury lamp of 2 kW at a position 20 cm away from the substrate for 30 seconds. Thereafter, each substrate was removed from the stamper. As a result, the hardened second dispersion was neatly transferred from the stamper to the substrate.

A 2,2'-dichloroethane solution containing 0.6 wt.% of cyanine dye NK 2883 (made by Nippon Kanko Shikiso Co., Ltd.) having the following formula was prepared.

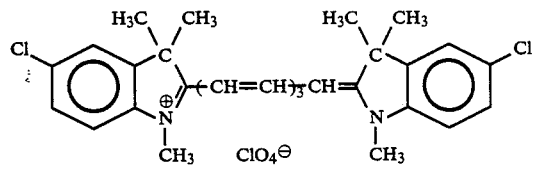

To this solution, an Ni-Complex light resistant agent, PA-1006 (made by Mitsui Toatsu Fine Chemicals Inc.) was added in an amount equal to 15 wt.% of the cyanine dye. This solution was then applied to the stamped side of each substrate whereby a recording layer having a thickness of 600 Å was formed.

An inner circumferential spacer and an outer circumferential spacer made of ABS having a thickness of 1 mm were fixed as shown in the FIGURE by an adhesive agent of the following formulation:

| | Parts by Weight |
|---|---|
| ERL 4299 | 90 |
| Spiroepoxy | 10 |
| Triphenyl-(o-nitrobenzyl)silane (photo-decomposition organic silicon compound) | 6 |
| Tris(acetylacetoacetato)aluminum | 1.5 |

The applied adhesive agent was hardened by use of a high-pressure mercury lamp (Trademark "UVL-2000-OS" made by Ushio Inc.) serving as ultraviolet-ray light source, with an exposure distance of 10 cm and an exposure time of 60 seconds, so that a sealed type optical information recording medium No. 1 according to the present invention was fabricated.

The thus prepared sealed type optical information recording medium No. 1 was free from the spreading of an unhardened portion of the adhesive agent into the organic dye in the sealed portions by contract with a conventional sealed type optical information recording medium fabricated by using a conventional ultraviolet-ray hardening type adhesive agent, and therefore, the reflectance, S/N ratio and the error ratio were as excellent as a sealed type optical information recording medium fabricated by use of a thermal polymerization type Lixon bond 1004A/B (made by Chisso Corporation). As a matter of course, the working efficiency at the sealing process was significantly improved.

EXAMPLE 2

Example 1 was repeated except that the adhesive agent employed in Example 1 was replaced by an adhesive agent of the following formulation, whereby a sealed type optical information recording medium No. 2 according to the present invention was fabricated.

|  | Parts by Weight |
| --- | --- |
| ERL 4299 | 100 |
| Polyvinyl pyrrolidone | 40 |
| Tris(4-chlorophenyl)silyl-tert-butyl peroxide | 6 |
| Erythrosine B | 1 |
| Tris(salicylaldehydato) aluminum | 1.5 |

EXAMPLE 3

20 parts by weight of a 1,2-dichlorethane solution containing 1.0 wt.% of cyanine dye NK 3125 (made by Nippon Kanko Shikiso Co., Ltd.) having the following formula, 78 parts by weight of methanol, 3 parts by weight of isopropyl alcohol, and 0.5 parts by weight of n-butanol were mixed to prepare a solution.

To the above solution, a stabilizer of the following formula was added in an amount of 0.15 wt.%, whereby a recording layer coating liquid was prepared.

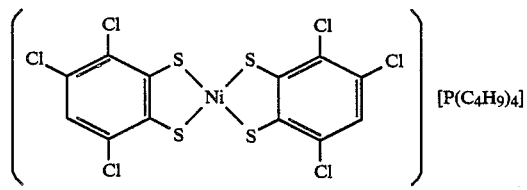

The above prepared recording layer coating liquid was coated on a pair of polycarbonate substrates having a diameter of 130 mm and a thickness of 1 mm, and dried, so that a recording layer with a thickness of 600 Å was formed on each of the substrates. The thus prepared pair of recording media was sealed by an adhesive agent of the following formulation, by use of an ABS spacer having a thickness of 1 mm:

|  | Parts by Weight |
| --- | --- |
| ERL 4299 | 100 |
| Tris(4-chlorophenyl)-(o-nitrobenzyloxy) silane | 6.8 |
| Tris(ethylacetoacetato) aluminum | 1.7 |

The applied adhesive agent was hardened by use of a high-pressure mercury lamp (UVL-2000-OS made by Ushio Inc.) serving as ultraviolet-ray light source, with an exposure distance of 10 cm and an exposure time of 50 seconds, so that a sealed type optical information recording medium No. 3 according to the present invention was fabricated.

The thus prepared sealed type optical information recording medium No. 3 was free from the spreading of an unhardened portion of the adhesive agent into the dye in the sealed portions by contrast with a conventional sealed type optical information recording medium fabricated using a conventional ultraviolet-ray hardening type adhesive agent, and therefore, the reflectance, S/N ratio and the error ratio were as excellent as a sealed type optical information recording medium fabricated by use of a thermal polymerization type Lixon bond 1004A/B (made by Chisso Corporation).

The adhesive agent employed in the above has an extremely strong adhesive force to the polycarbonate substrates and the ABS spacer. The adhesive force was not deteriorated at all in the conditions of 60° C., 90%, for 18 months.

EXAMPLE 4

20 parts by weight of a 1,2-dichloroethane solution containing 1.0 wt.% of cyanine dye NK 2421 (made by Nippon Kanko Shikiso Co., Ltd.), 78 parts by weight of methanol, 3 parts by weight of isopropyl alcohol, and 0.5 parts by weight of n-butanol were mixed to prepare a solution.

To the above solution, a stabilizer of the following formula was added in an amount of 0.15 wt.%, whereby a recording layer coating liquid was prepared.

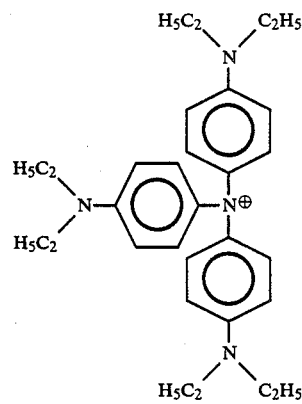

The above prepared recording layer coating liquid was coated on a pair of polycarbonate substrates having a diameter of 130 mm and a thickness of 1 mm, and dried, so that a recording layer with a thickness of 600 Å was formed on each of the substrates. The thus prepared pair of recording media was sealed by an adhesive layer of the following formulation, by use of an ABS spacer having a thickness of 1 mm:

|  | Parts by Weight |
| --- | --- |
| ERL 4299 | 80 |
| Epicote 828 | 20 |
| (o-nitrobenzyloxy)triphenyl silane | 5 |
| Tris(salycilaldehydato) aluminum | 1 |

The applied adhesive agent was hardened by use of a high-pressure mercury lamp (UVL-2000-OS made by Ushio Inc.) serving as ultraviolet-ray light source, with an exposure distance of 10 cm and an exposure time of 120 seconds, so that a sealed type optical information recording medium No. 4 according to the present invention was fabricated.

The thus prepared sealed type optical information recording medium No. 4 was free from the spreading of an unhardened portion of the adhesive agent into the dye in the sealed portions by contrast with a conventional sealed type optical information recording medium fabricated using a conventional ultraviolet-ray hardening type adhesive agent, and therefore, the reflectance, S/N ratio and the error ratio were as excellent as a sealed type optical information recording medium fabricated by use of a thermal polymerization type Lixon bond 1004A/B (made by Chisso Corporation).

What is claimed is:

1. An optical information recording medium comprising a pair of disc-shaped substrates, at least one of the substrates having a recording layer comprising an organic dye compound on one side thereof, which are disposed so as to face each other, with the recording layer positioned therebetween, with or without a space between the two substrates, by sealing with an adhesive agent comprising an alicyclic epoxy resin component having general formula

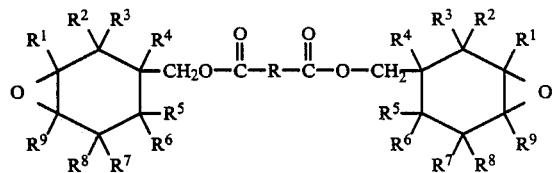

where $R^1 \sim R^9$ each represent hydrogen, an alkyl group having 1 to 4 carbon atoms, or halogen; and R represents $(CH_2)_n$, where n is an integer of 1 to 4,

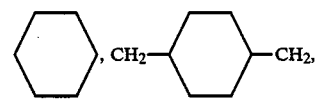

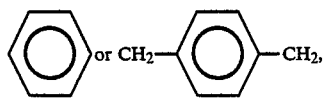

and a composite catalyst comprising a photo-decomposition organic silicon compound, and a metal complex.

2. The optical information recording medium as claimed in claim 1, wherein said organic dye compound is a cyanine dye.

3. The optical information recording medium as claimed in claim 1, wherein said organic dye compound is a merocyanine dye.

4. The optical information recording medium as claimed in claim 1, wherein said alicyclic epoxy resin component is

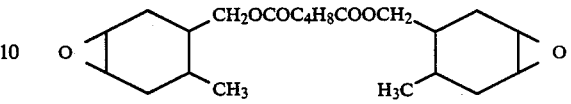

5. The optical information recording medium as claimed in claim 1, wherein said alicyclic epoxy resin component is

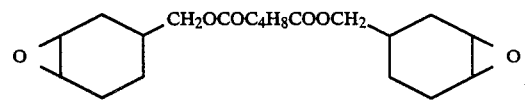

6. The optical information recording medium as claimed in claim 1, wherein said alicyclic epoxy resin component is selected from the group consisting of:

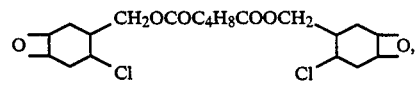

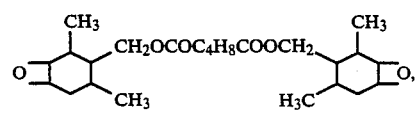

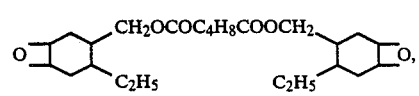

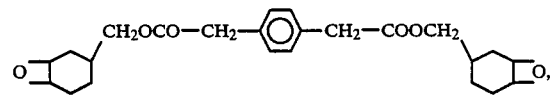

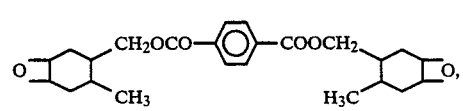

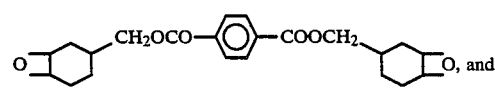

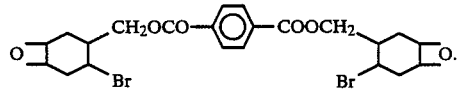

7. The optical information recording medium as claimed in claim 1, wherein said photo-decomposition organic silicon compound is selected from the group consisting of silyl peroxide, o-nitrobenzyl silyl ether, alkoxy silane and silyl ketone.

8. The optical information recording medium as claimed in claim 1, wherein said metal complex is tris($\beta$-diketonato)aluminum.

* * * * *